United States Patent
De Gregorio Hurtado et al.

(10) Patent No.: US 8,240,059 B2
(45) Date of Patent: Aug. 14, 2012

(54) DETECTION METHOD TO CONTROL THE MIGRATION OF BANDED SLEEVES IN DIFFICULT TO ACCESS HARDWARE AND DETECTION DEVICE

(75) Inventors: Yolanda De Gregorio Hurtado, Getafe (ES); Alberto Balsa González, Getafe (ES)

(73) Assignee: Airbus Operations, SL, Getafe (Madrid) (ES)

( * ) Notice: Subject to any disclaimer, the term of this patent is extended or adjusted under 35 U.S.C. 154(b) by 0 days.

(21) Appl. No.: 13/154,493

(22) Filed: Jun. 7, 2011

(65) Prior Publication Data

US 2012/0000084 A1    Jan. 5, 2012

(30) Foreign Application Priority Data

Jun. 30, 2010    (ES) .................................. 201031011

(51) Int. Cl.
*G01D 21/00* (2006.01)
(52) U.S. Cl. .......................................... 33/626; 33/613
(58) Field of Classification Search .................... 33/626, 33/613, 533, 562, 563, 1 BB, 1 CC
See application file for complete search history.

(56) References Cited

U.S. PATENT DOCUMENTS

| | | | | |
|---|---|---|---|---|
| 1,746,691 A * | 2/1930 | Wiggin | ............................. | 33/562 |
| 2,887,776 A * | 5/1959 | Eisner | ............................. | 33/528 |
| 3,287,813 A * | 11/1966 | Lennon et al. | .................. | 33/562 |
| 5,775,036 A * | 7/1998 | Stanley, Sr. | ...................... | 33/562 |
| 5,799,408 A * | 9/1998 | Sprayberry | ...................... | 33/645 |
| 5,960,554 A * | 10/1999 | Kamykowski | .................. | 33/562 |
| 6,508,010 B2 * | 1/2003 | Hanson et al. | ................... | 33/613 |
| 6,631,565 B2 * | 10/2003 | Wu et al. | .......................... | 33/645 |
| 6,820,349 B2 * | 11/2004 | Peine | .............................. | 33/645 |
| 6,839,979 B1 * | 1/2005 | Godbole et al. | ................. | 33/645 |
| 6,912,796 B2 * | 7/2005 | Erdloff | ............................ | 33/645 |
| 7,246,449 B2 * | 7/2007 | Pierson et al. | ................... | 33/613 |
| 7,257,904 B1 * | 8/2007 | Brown et al. | .................... | 33/562 |
| 7,487,598 B2 * | 2/2009 | Krachtus | .......................... | 33/613 |
| 8,083,881 B1 * | 12/2011 | Reeves | ............................. | 33/613 |
| 2002/0144421 A1 * | 10/2002 | Hanson et al. | ................... | 33/613 |
| 2010/0064802 A1 * | 3/2010 | Dempsey et al. | ............... | 33/613 |
| 2011/0308099 A1 * | 12/2011 | Kussner et al. | .................. | 33/613 |

* cited by examiner

*Primary Examiner* — Yaritza Guadalupe-McCall

(74) *Attorney, Agent, or Firm* — Wenderoth, Lind & Ponack, LLP.

(57) ABSTRACT

The detection method is performed by a characteristic tool (1) constituting the detection device, incorporating a lateral tab (10) and a front end edge (11), so that when the tool is applied to determine whether a banded sleeve has migrated, it happens that if the same is located correctly, such side tab (10) is supported by its front seat (12) on a centered portion (13) of the free edge of the respective lug (4) of the hardware (5).

In contrast, when the banded sleeve (2) has migrated axially moving from its location, in this case of anomaly, the front end edge (11) of the tool (1) will contact with the projection of the banded sleeve (2) instead of contacting the side tab (10) on the central portion (13).

6 Claims, 4 Drawing Sheets

DETECTION METHOD TO CONTROL THE MIGRATION OF BANDED SLEEVES IN DIFFICULT TO ACCESS HARDWARE AND DETECTION DEVICE

OBJECT OF THE INVENTION

The present invention, as expressed in the title of this specification, relates to a detection method to control the migration of banded sleeves in difficult to access hardware and detection device.

The method is intended to detect in time any axial displacement of a banded sleeve in cases where access is not good, but difficult and that at a simple visual inspection and standard measuring tools (rulers, calipers, . . . ) are not reliable enough, to be sure if the banded sleeve has migrated or not.

Therefore, the invention is applicable mainly in cases in which there is no good access to the area to be inspected and precision in determining whether the banded sleeve has migrated or has not migrated is needed. To do this, a characteristic tool has been designed by which it can be determined with complete security and reliability if the banded sleeve has migrated or has not migrated and thus being able to take the necessary measures to correct this anomaly in time to avoid problems of wear and more serious problems arising from the anomaly of the migration or axial displacement of the banded sleeve.

BACKGROUND OF THE INVENTION

Banding sleeves on hardware is a very common technique from the standpoint of design, so that today there are many joints in which some sliding sleeves are fitted over some banded sleeves these in turn embedded in holes in the hardware itself, being adjusted on the other side on the sliding sleeves a bolt or similar axially fixed, through which all of the hardware assembly is linked to another element. In all cases, all of the sleeves shall be adjusted with a predetermined and perfectly calculated torque.

Thus, in principle banded sleeves must remain fixed throughout the life of the joint, but in reality we can find cases where these sleeves "migrate" and leave their housing in the hardware. This migration causes a loss of strength in the hardware lug, and may even lead to its failure with the serious consequences that this would imply.

Hence the importance of knowing throughout the life of the aircraft if these sleeves are well installed or, if on the contrary, have lost torque and have migrated.

The way to see in service, during maintenance, if these sleeves migrate or not is through a detailed visual inspection of the area. Also, in some cases if the access allows us, we can measure with a gauge the diameter of the visible part of the sleeve and check if it is the diameter of the banded sleeve or it is the diameter of the sliding sleeve.

These methods are based on the fact that there is good access to the area in question and that simply with a visual inspection of the area or with a gauge we can determine whether the cap has migrated or not.

In contrast, when the access to the area to be inspected is not good, the difficulty of a visual inspection that can be 100% reliable decreases. Moreover, even if we get access to introduce a small ruler and even if we could measure, for example, a preset distance, which would allows us to know if there is migration, as soon as we were not able to obtain, when measuring, a good perpendicularity on the edge of a lug, that measurement could be distorted. If we add that the banded sleeve may have a very small thickness, the deviations of the perpendicular of only a few degrees can make us believe that the banded sleeve has not migrated when it has, in fact, migrated.

DESCRIPTION OF THE INVENTION

In order to achieve the objectives and avoid the drawbacks mentioned in the preceding paragraphs, the invention proposes a detection method to control the migration of banded sleeves in hard to reach hardware, hardware that comprise a structure that incorporates pairs of lugs with holes facing each other where some banded sleeves are adjusted with the predetermined torque where, in turn, respective sliding sleeves are adjusted on which a bolt is attached as a means of connection between the hardware and another element, said bolt being axially fixed in a conventional manner.

The end edges of the banded sleeve are leveled with the facing sides of the lugs when such banded sleeve has not migrated axially moving out and therefore is located in its correct position.

In contrast, when the banded sleeve migrates moving axially outward, a portion of it protrudes with respect to one of the facing sides of the lugs.

To detect this anomaly a tool determined by a thin piece has been provided, one of whose faces has at least one flat surface complementary supported on the respective face of the lugs, having said tool a side tab next to one extreme front edge of such tool, the front seat of which side tab has a trajectory that is complemented by the profile of a centered portion of the free edge of the lugs, so that when the banded sleeve has migrated, by placing the tool perpendicular to the direction of the sleeves and bolt settling the flat surface of one of their faces on the respective facing side of the lug, the side tab of the tool fails to support on the centered portion of the free edge of the respective lug because the front end edge of the tool first contacts with the overhang of the banded sleeve emerging with respect to the respective outer face of the lug.

However, if the banded sleeve has not migrated, the side tab of the tool will stop against the complementary free edge portion of the respective lug, showing with this that the banded sleeve is properly located, as the distance between the front seat of the side tab and the front end edge of the tool is equal to or slightly less than the distance between such free edge of the lug and the larger diameter of the sliding sleeve.

Therefore, if we take the characteristic tool until its side tab supports on the respective lug, if no resistance is found it means that the banded sleeve has not migrated contacting the tool by its front end edge over the sliding sleeve. In contrast, if we find resistance before the side tab supports on corresponding lug it means that the banded sleeve has migrated having axially displaced from its location.

Thus, the characteristic tool of the invention is based on the dimensions of the respective lugs and the diameters of the sliding sleeve and banded sleeve.

On the other hand, it should be noted that although in theory the banded sleeves should not slip out of their position throughout their life, the reality is that in some cases such banded sleeves move axially from its initial location, for example due to the use of materials with very different expansion coefficient. Namely and particularly the migration of sleeves has been detected in titanium hardware with steel sleeve, so that the banded sleeve is chosen from a harder material precisely to protect the hardware, while the sliding sleeve is usually softer and is placed in its position with a small looseness.

If, as we said above, by having a different expansion coefficient the interference relaxes and the sleeve moves, the load will not be distributed properly and the sleeve can break as well as the lug, and this may cause other breaks and more serious problems. Therefore the invention is designed specifically to detect this abnormal condition of design so that the method of the invention by means of the detection tool acts as a pass/not pass based on the size difference between the diameters of the banded and sliding sleeve.

The side tab that includes the tool is designed to support on the lug such as it has been stated earlier.

The detection tool is specifically designed to be used in hardware where the difference of the diameters of the sleeves is very small, making it much more difficult to detect if there has been axial displacement.

This type of errors were not controlled until now, but having a user-friendly tool as the tool described in the present invention, could be incorporated into the revisions made to the hardware.

Next, to facilitate a better understanding of this specification and forming an integral part of it some figures are attached wherein by way of illustration and not limitation the object of the invention has been represented.

DESCRIPTION OF THE PREFERRED EMBODIMENT

Figure 1:
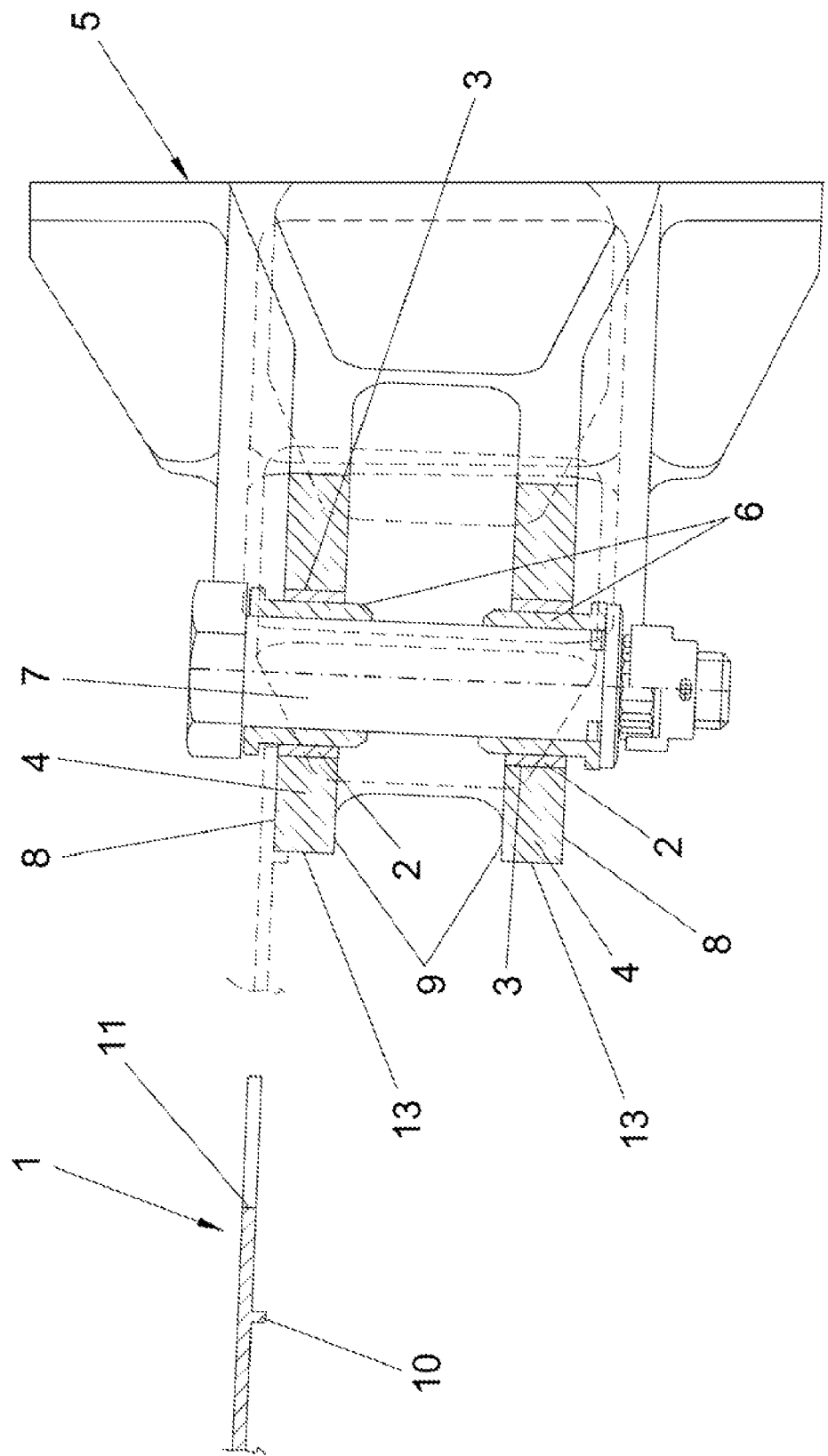
FIG. 1.—Shows a sectional view of a connection between a hardware and other element through a bolt coupled on two sliding sleeves fitted in respective banded sleeves fitted, in turn, in a couple of lugs of the hardware, the invention consisting of a detection method to control the migration of banded sleeves in difficult to access hardware and detection device, object of the invention. In this view the banded sleeves are in place without being axially displaced from their location.
Figure 2:
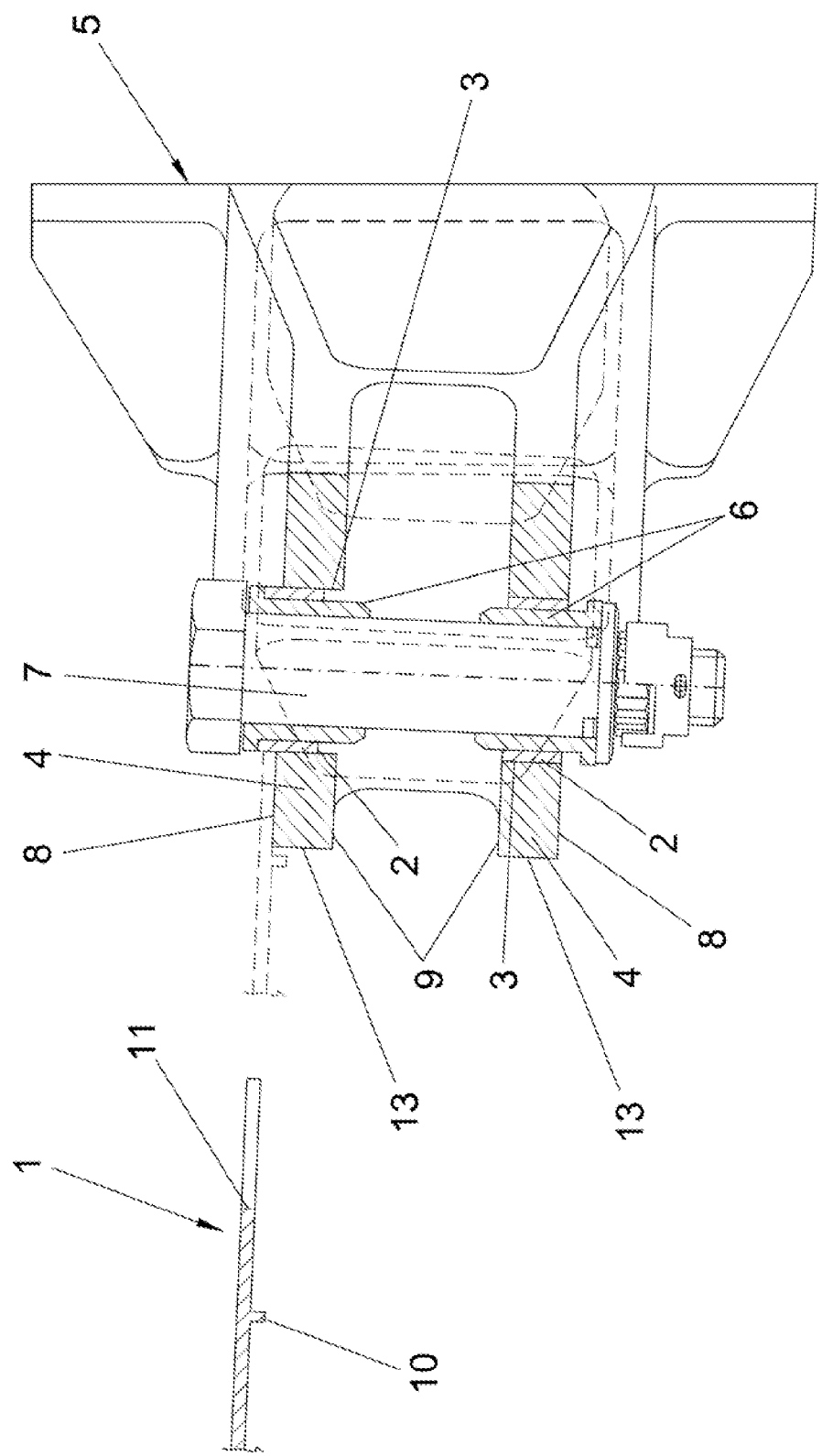
FIG. 2.—Shows a view similar to the previous one, with the difference that in this FIG. 2, a banded sleeve has migrated axially moving outward from its initial location, this migration being detected by the detection device.
Figure 3:
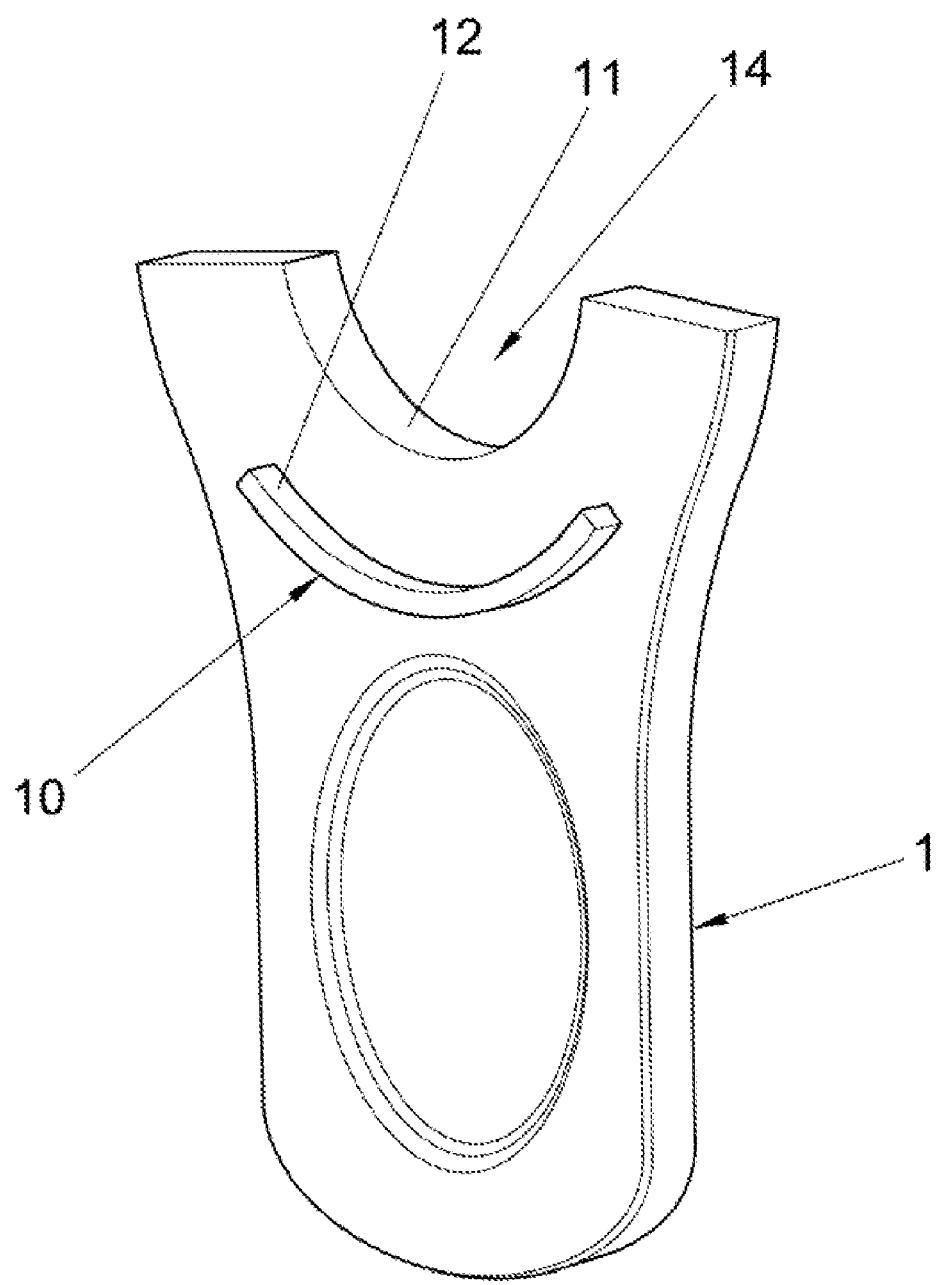
FIG. 3.—Shows a perspective view of the detection device.
Figure 4:
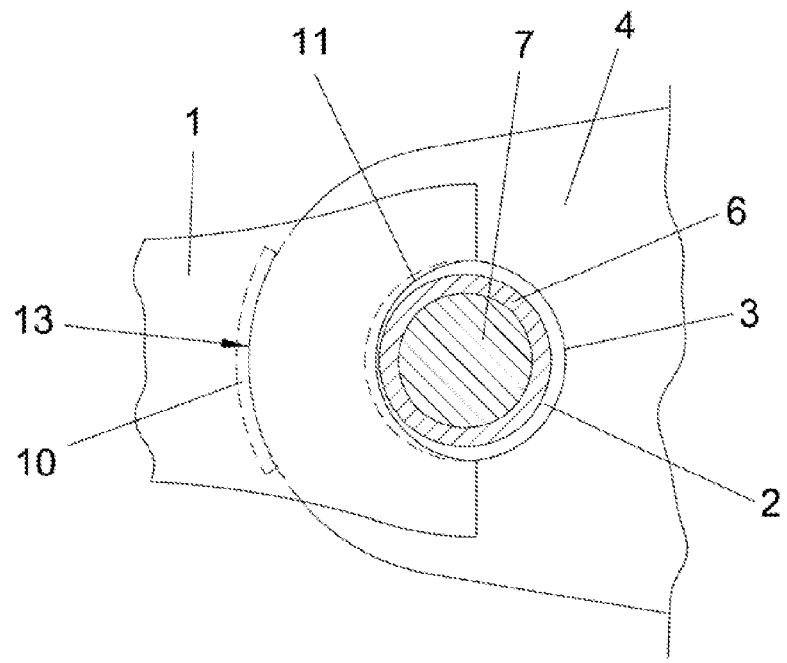
FIG. 4.—Shows a sectional view showing a correct location of a banded sleeve.
Figure 5:
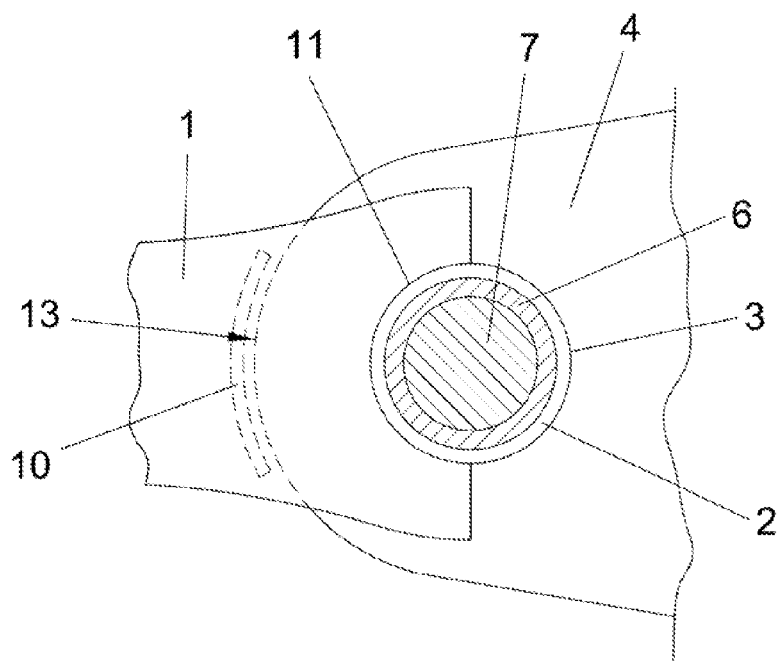
FIG. 5.—Represents a sectional view which shows an abnormal location of a banded sleeve.

Considering the numbering adopted in the figures, the detection method to control the migration of banded sleeves in difficult to access hardware consists of detecting by means of a characteristic tool (1), any minimum axial displacement of the banded sleeves (2) fitted in through holes (3) of some lugs (4), of a hardware (5), banded sleeves (2) that fit in turn some sliding sleeves (6), wherein, in turn, a bolt (7) axially fixed is coupled, which serves as a link between such hardware (5) and other element not shown in the figures.

The extreme edges of the banded sleeves (2) are leveled with the facing sides (8-9) of the lugs (4) of the hardware (5) when such banded sleeves (2) have not migrated maintaining their correct position without being axially displaced outward.

In contrast, when one of the banded sleeves (2) migrates, an end portion thereof protrudes outward with respect to one of the facing sides (8-9) of the respective lug (4) of the hardware (5).

The aforementioned tool (1), comprises a one piece part that has two flat faces parallel to each other, from one of which starts a side tab (10) of curved configuration near and parallel to a portion of a front end edge (11) which defines a semicircular recess which has a slightly larger diameter than the outside diameter of the sliding sleeve (6), but smaller than the outside diameter of the banded sleeve (2).

Thus the distance between a front seat (12) of the side tab (10) and the front end edge (11) of the tool (1) will be equal to or slightly less than the distance between a centered portion (13) of the free edge of the lug (4) and the outer diameter of the sliding sleeve (6), said distance corresponding to the area of less thickness of the lug (4).

On this premise on which is described when a banded sleeve (2) maintains its correct position its ends being leveled with the facing sides (8-9) of the respective lug 4 of the hardware (5) and an abnormal position when a banded sleeve (2) has migrated protruding a portion thereof with respect to one of the facing sides (8-9) of the lug (4), the method for monitoring the correct or incorrect position of the banded sleeve (2) is carried out by the characteristic tool (1) comprising a simple one piece structure that supports on a facing side (8-9) of the lug (4) moving perpendicularly to the direction of the banded sleeve (2) continuing to support the tool 1 on such facing side (8-9) of the lug (4), so that if the banded sleeve (2) is in its correct position, the displacement of the tool (1) is stopped when the side tab (10) abuts by its front seat (12) against the centered portion (13) of the free edge of the lug (4), while if the banded sleeve (2) has migrated, the side tab (10) does not contact against that centered portion (13) of the free edge of the lug (4), but the tool (1) contacts by its front end edge (11) against the projecting portion of the banded sleeve (2).

The front end edge (11) of the tool (1) defines a semicircular recess (14) which has a diameter slightly larger than the outside diameter of the sliding sleeve (6) but smaller than the outside diameter of the banded sleeve (2).

The invention claimed is:

1. DETECTION METHOD TO CONTROL THE MIGRATION OF BANDED SLEEVES IN DIFFICULT TO ACCESS HARDWARE, the banded sleeves being fitted in facing holes of some hardware lugs, while in those banded sleeves respective sliding sleeves are fitted where an axially fixed bolt is coupled, being the end edges of the banded sleeves leveled with the facing sides of the lugs when placed in proper position, while when such banded sleeves migrate moving axially, a portion of such banded sleeves protrudes in relation to one of the facing sides of such lugs of the hardware, wherein the control of the migration of a banded sleeve (2) is carried out by a tool (1) that includes at least one flat surface that rests on one of the facing sides (8-9) of the lugs (4) of the hardware (5), moving said tool (1) perpendicular towards the location of the banded sleeve (2) continuing to support the tool (1) on the facing side (8-9) of the tab (4), incorporating the flat face of the tool (1) a side tab (10) that abuts by its front seat (12) against a centered portion (13) of the free edge of the tab (4) when the banded sleeve (2) maintains its correct position without axial displacement thereof while when it has migrated moving axially outward with respect to the facing side (8-9) of the tab (4), during the movement of the tool (1) its side tab (10) fails to contact against the centered portion (13) of the free edge of the tab (4), but in this case of anomaly, a front end edge (11) of the tool (1) contacts against the protruding portion of the banded sleeve (2).

2. DETECTION METHOD TO CONTROL THE MIGRATION OF BANDED SLEEVES IN DIFFICULT TO ACCESS HARDWARE, according to claim 1, wherein the front seat (12) of the side tab (10) of the tool (1) has a trajectory complementary to the contour of the centered portion (13) of the free edge of the respective lug (4).

3. DETECTION METHOD TO CONTROL THE MIGRATION OF BANDED SLEEVES IN DIFFICULT TO ACCESS HARDWARE, according to claim 1, wherein the front end edge (11) of the tool (1) defines a semicircular recess (14) which has a diameter slightly larger than the outside diameter of the sliding sleeve (6) but smaller than the outer diameter of the banded sleeve (2).

4. DETECTION METHOD TO CONTROL THE MIGRATION OF BANDED SLEEVES IN DIFFICULT TO ACCESS HARDWARE, according to claim 2, wherein the front end edge (11) of the tool (1) defines a semicircular recess (14) which has a diameter slightly larger than the outside diameter of the sliding sleeve (6) but smaller than the outer diameter of the banded sleeve (2).

5. DETECTION DEVICE TO CONTROL THE MIGRATION OF BANDED SLEEVES IN DIFFICULT TO ACCESS HARDWARE, that being intended to control the axial displacement of banded sleeves adjusted in facing through holes of the lug of a hardware, wherein it comprises a tool (1) determined by a thin piece, which incorporates at least in one of its facing sides a flat surface from where it starts a side tab (10) provided with a front seat (12), complementing said front seat (12) with a front end edge (11) next to the front seat (12), corresponding the distance between it and the front end edge (11) with a magnitude somewhat less than the distance existing between a centered portion (13) of the free edge of the lugs (4) and the inner diameter of the banded sleeve (2) adjusted in the respective through hole (3) of the tab (4).

6. DETECTION DEVICE TO CONTROL THE MIGRATION OF BANDED SLEEVES IN DIFFICULT TO ACCESS HARDWARE, according to claim 5, wherein the front seat (12) of the side tab (10) of the tool (1) has a trajectory consistent with the contour of the centered portion (13) of the free edge of the respective lug (4), while the front end edge (11) of the tool (1) defines a semicircular recess which has a smaller diameter than the outside diameter of the banded sleeve (2).

* * * * *